United States Patent
Honkomp et al.

(10) Patent No.: US 11,629,601 B2
(45) Date of Patent: Apr. 18, 2023

(54) TURBOMACHINE ROTOR BLADE WITH A COOLING CIRCUIT HAVING AN OFFSET RIB

(71) Applicant: General Electric Company, Schenectady, NY (US)

(72) Inventors: Mark Steven Honkomp, Taylors, SC (US); William Scott Zemitis, Simpsonville, SC (US); Melbourne James Myers, Duncan, SC (US); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/835,476

(22) Filed: Mar. 31, 2020

(65) Prior Publication Data
US 2021/0301667 A1    Sep. 30, 2021

(51) Int. Cl.
*F01D 5/18*    (2006.01)

(52) U.S. Cl.
CPC ............. *F01D 5/187* (2013.01); *F01D 5/188* (2013.01); *F05D 2240/301* (2013.01); *F05D 2240/81* (2013.01); *F05D 2250/185* (2013.01); *F05D 2260/22141* (2013.01)

(58) Field of Classification Search
CPC .......... F01D 5/186; F01D 5/187; F01D 5/188; F05D 2240/81; F05D 2260/20; F05D 2260/202; F05D 2240/301; F05D 2250/185; F05D 2260/22141
See application file for complete search history.

(56) References Cited

U.S. PATENT DOCUMENTS

| | | | |
|---|---|---|---|
| 4,073,599 A * | 2/1978 | Allen | F01D 5/20 416/97 R |
| 4,177,010 A * | 12/1979 | Greaves | F01D 5/187 416/96 A |
| 4,738,587 A * | 4/1988 | Kildea | F01D 5/187 416/97 R |
| 5,674,050 A | 10/1997 | Hall et al. | |
| 5,873,695 A | 2/1999 | Takeishi et al. | |
| 6,761,535 B1 * | 7/2004 | McGrath | F01D 5/147 416/243 |
| 7,600,973 B2 * | 10/2009 | Tibbott | F01D 5/187 416/189 |
| 8,562,286 B2 | 10/2013 | Gleiner et al. | |
| 8,864,467 B1 | 10/2014 | Liang | |
| 8,974,182 B2 | 3/2015 | Boyer et al. | |

(Continued)

FOREIGN PATENT DOCUMENTS

| | | | |
|---|---|---|---|
| DE | 19859785 A1 | 7/1999 | |
| GB | 2462087 A | 1/2010 | |
| WO | WO-2017/121689 A1 * | 7/2017 | F01D 5/189 |

OTHER PUBLICATIONS

European Search Report Corresponding to Application No. 21162178 dated May 6, 2021.

*Primary Examiner* — Christopher Verdier (74) *Attorney, Agent, or Firm* — Dority & Manning, P.A.

(57) ABSTRACT

A rotor blade for a turbomachine is provided. The rotor blade includes a platform, an airfoil extending from the platform, and a cooling circuit extending within the platform and the airfoil. The cooling circuit includes a plurality of cooling passages defined by a plurality of ribs. The plurality of ribs includes an offset rib.

16 Claims, 8 Drawing Sheets

(56) References Cited

U.S. PATENT DOCUMENTS

| | | |
|---|---|---|
| 2004/0094287 A1 | 5/2004 | Wang |
| 2005/0008487 A1* | 1/2005 | Lee ............................ F01D 5/20 |
| | | 416/97 R |
| 2005/0031445 A1* | 2/2005 | McClelland ............. F01D 9/041 |
| | | 415/115 |
| 2005/0111976 A1* | 5/2005 | Lee .......................... F01D 5/187 |
| | | 416/97 R |
| 2007/0189898 A1 | 8/2007 | Hooper et al. |
| 2013/0156601 A1 | 6/2013 | Propheter-Hinckley et al. |
| 2013/0209253 A1 | 8/2013 | Zemitis et al. |
| 2015/0110639 A1 | 4/2015 | Herzlinger et al. |
| 2015/0204197 A1* | 7/2015 | Lee ............................ F01D 9/02 |
| | | 416/97 R |
| 2015/0354366 A1* | 12/2015 | Simpson .................. F01D 5/147 |
| | | 60/772 |
| 2016/0312620 A1* | 10/2016 | Diamond ................. B23P 15/02 |
| 2016/0319680 A1 | 11/2016 | Roman-Morales et al. |
| 2017/0002664 A1 | 1/2017 | McKenzie et al. |
| 2018/0094527 A1* | 4/2018 | Halfmann ................ F01D 5/082 |
| 2019/0153871 A1 | 5/2019 | Zemitis et al. |
| 2020/0392852 A1* | 12/2020 | Eshak ...................... F01D 5/187 |
| 2020/0400031 A1* | 12/2020 | Joo ............................ F01D 9/02 |

* cited by examiner

TURBOMACHINE ROTOR BLADE WITH A COOLING CIRCUIT HAVING AN OFFSET RIB

FIELD

The present disclosure relates generally to turbomachines and, in particular, to an airfoil for a turbomachine which includes a cooling circuit having an offset rib.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section typically includes rows of circumferentially spaced stator vanes and rotor blades. A rotor blade generally includes an airfoil having a pressure side and a suction side and extending radially upward from a platform. A shank portion may extend radially downward from the platform and may include structures to secure the rotor blade to a turbine wheel. The platform generally defines an inner boundary for the hot combustion gases flowing through a gas path. The intersection of the platform and the airfoil may be an area of high stress concentration due to the hot combustion gases, the mechanical loading thereon, and other causes.

More specifically, there is often a large amount of thermally or otherwise induced strain at the intersection of an airfoil and a platform. This induced strain may be due to the temperature differentials between the airfoil and the platform, temperature differentials between the pressure side and the suction side, and rotational velocity loading. The induced strain may combine with geometric discontinuities in the region, thereby creating areas of very high stress that may limit overall component lifetime. To date, these issues have been addressed by attempting to keep geometric discontinuities, such as root turns, tip turns, internal ribs, and the like, away from the intersection. Further, attempts have been made to control the temperature about the intersection. However, the intersection of the airfoil and the platform often continues to be life-limiting in many rotor blades.

Accordingly, improved features for cooling and/or reducing strain in rotor blades are desired in the art.

BRIEF DESCRIPTION

Aspects and advantages of the assemblies in accordance with the present disclosure will be set forth in part in the following description, or may be obvious from the description, or may be learned through practice of the technology.

In accordance with one embodiment, a rotor blade for a turbomachine is provided. The rotor blade includes a platform, an airfoil extending from the platform, and a cooling circuit extending within the platform and the airfoil. The cooling circuit includes a plurality of cooling passages defined by a plurality of ribs. The plurality of ribs includes an offset rib.

In accordance with another embodiment, a turbomachine is provided. The turbomachine defines an axial direction, a circumferential direction extending around the axial direction, and a radial direction perpendicular to the axial direction. The turbomachine includes a compressor, a combustor downstream of the compressor, and a turbine downstream of the combustor. The turbine includes a rotor blade mounted to a rotor disk. The rotor blade includes a platform, an airfoil extending outward along the radial direction from the platform, and a cooling circuit extending within the platform and the airfoil. The cooling circuit includes a plurality of cooling passages defined by a plurality of ribs. The plurality of ribs includes an offset rib.

These and other features, aspects and advantages of the present assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present assemblies, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present assemblies, one or more examples of which are illustrated in the drawings. Each example is provided by way of explanation, rather than limitation, of the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel to and/or coaxially aligned with an axial centerline of a particular component, and the term "circumferentially" refers to the relative direction that extends around the axial centerline of a particular component. Terms of approximation, such as "generally" or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
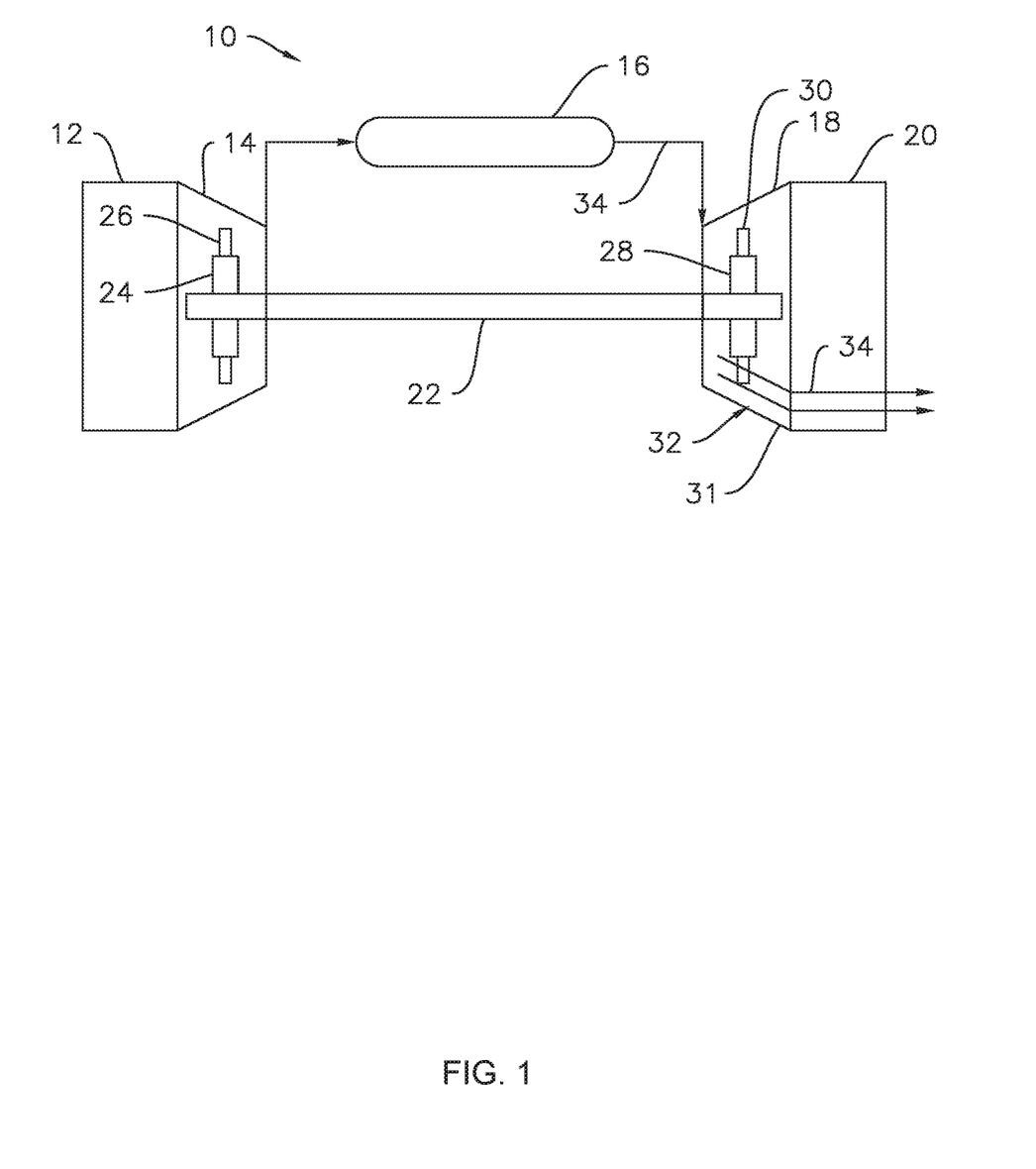
FIG. 1 is a schematic illustration of a turbomachine, in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine, unless otherwise specified in the claims. For example, the rotor blade as described herein may be used in any type of turbomachine including, but not limited to, a steam turbine, an aircraft gas turbine, or a marine gas turbine.

As shown, the gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
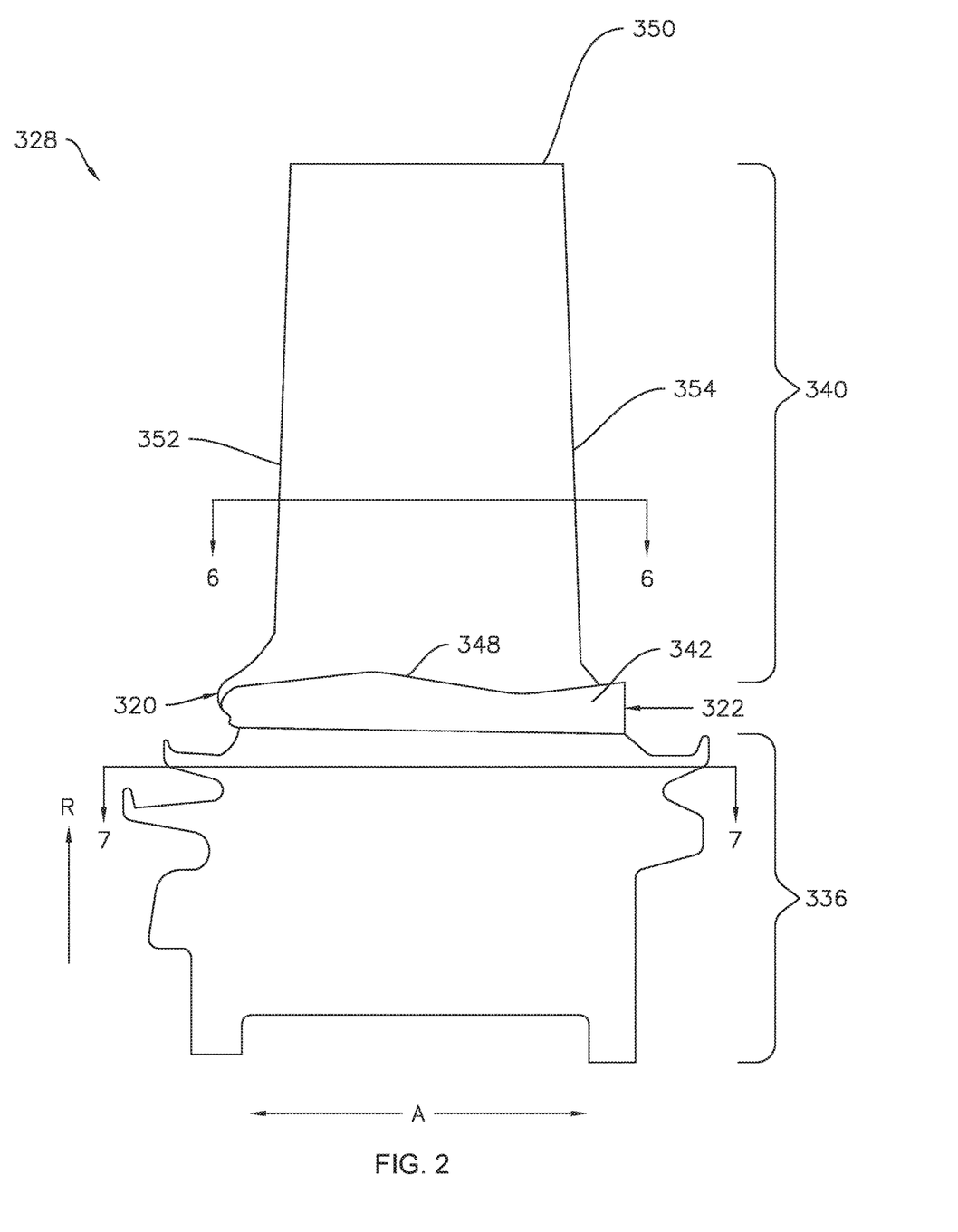
FIG. 2 illustrates a side view of an exemplary rotor blade, in accordance with embodiments of the present disclosure.
Figure 3:
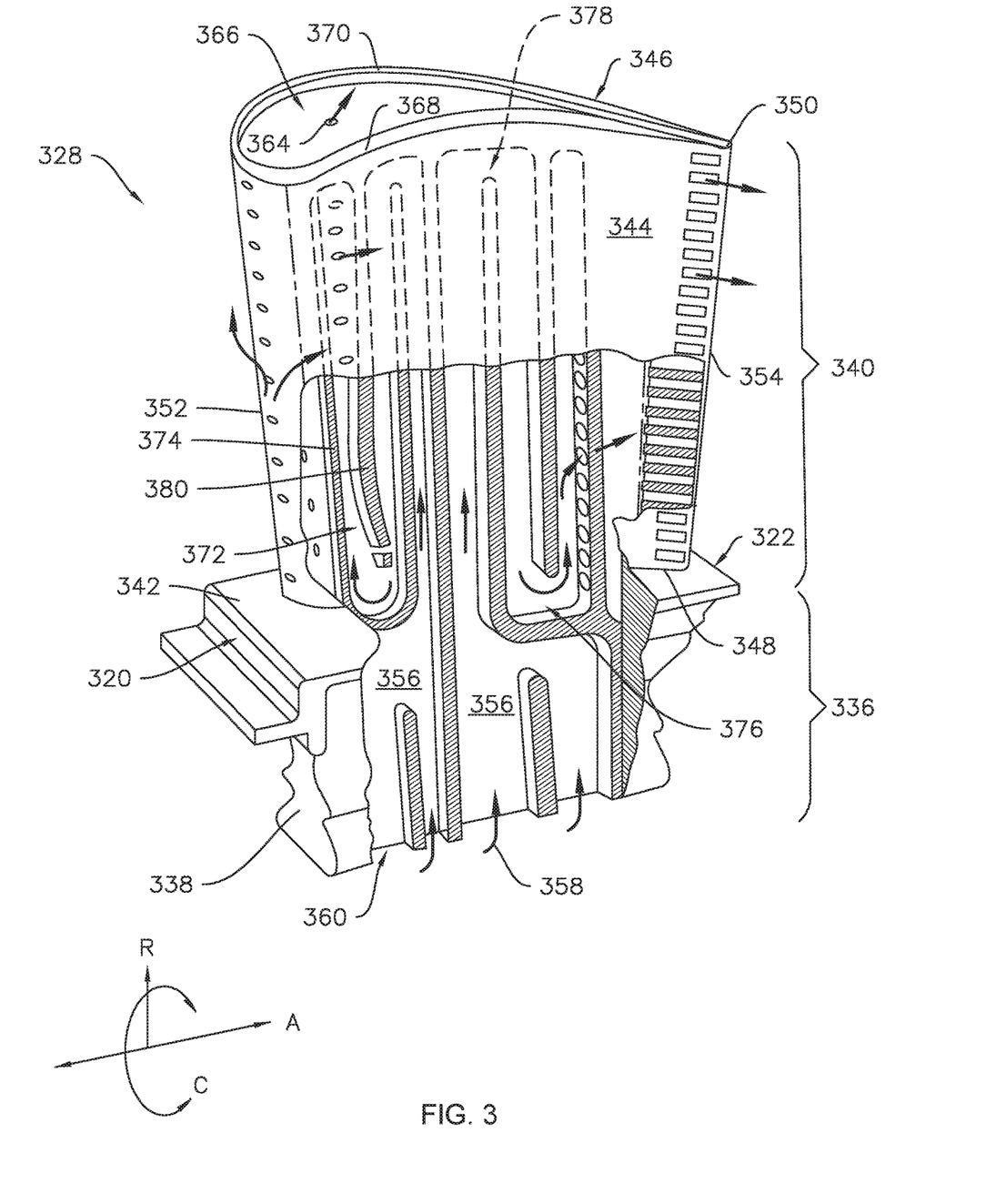
FIG. 3 illustrates a partially cut away perspective view of an exemplary rotor blade, in accordance with embodiments of the present disclosure.

As may be seen in FIGS. 2 and 3, the turbomachine 10 may define an axial direction A and a circumferential direction C, which extends around the axial direction A. The turbomachine 10 may also define a radial direction R perpendicular to the axial direction A.

FIG. 2 provides a side view of exemplary rotor blade 328 according to one or more embodiments of the present disclosure. FIG. 3 provides a perspective view of the exemplary rotor blade 328 of FIG. 2. As shown in FIGS. 2 and 3, the rotor blade 328 generally includes a mounting or shank portion 336 having a mounting body 338 and an airfoil 340 that extends outwardly, e.g., generally along the radial direction R, from a substantially planar platform 342. The platform 342 generally serves as the radially inward boundary for the hot gases of combustion 34 flowing through the hot gas path 32 of the turbine section 18 (FIG. 1). The platform 342 extends along the axial direction A from a leading face 320 to a trailing face 322. As shown in FIG. 3, the mounting body 338 of the mounting or shank portion 336 may extend radially inwardly from the platform 342 and may include a root structure, such as a dovetail, configured to interconnect or secure the rotor blade 328 to a rotor disk 28 (FIG. 1).

The airfoil 340 includes a pressure side wall 344 and an opposing suction side wall 346. The pressure side wall 344 and the suction side wall 346 extend substantially radially outwardly from the platform 342 in span from a root 348 of the airfoil 340, which may be defined at an intersection between the airfoil 340 and the platform 342, to a tip 350 of the airfoil 340. The pressure side wall 344 is connected to the suction side wall 346 at a leading edge 352 of the airfoil 340 and a trailing edge 354 downstream of the leading edge 352, and the airfoil 340 thus extends between the leading edge 352 and the trailing edge 354. The pressure side wall 344 generally comprises an aerodynamic, concave external surface of the airfoil 340. Similarly, the suction side wall 346 may generally define an aerodynamic, convex external surface of the airfoil 340. The tip 350 is disposed radially opposite the root 348. As such, the tip 350 may generally define the radially outermost portion of the rotor blade 328 and, thus, may be configured to be positioned adjacent to a stationary shroud or seal (not shown) of the turbomachine 10. The tip 350 may include a tip cavity 366.

Figure 6:
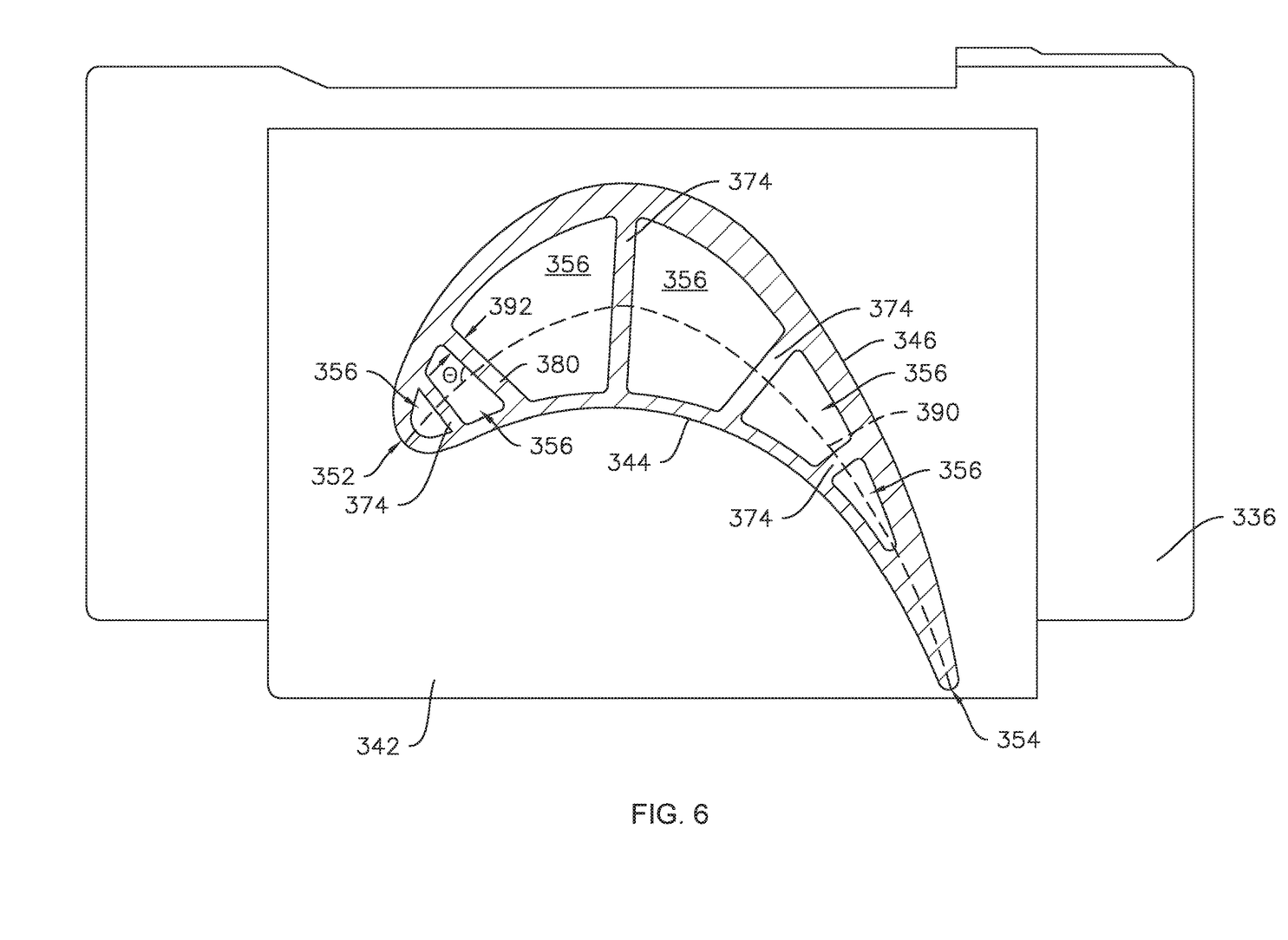
FIG. 6 illustrates a radially inward oriented section view taken through an airfoil of an exemplary rotor blade along line 6-6 in FIG. 2, in accordance with embodiments of the present disclosure.

As shown in FIG. 3, the rotor blade 328 may be at least partially hollow, e.g., the rotor blade 328 may include a cooling circuit 372 defined therein. The cooling circuit 372 may include a plurality of cooling passages 356 (shown partially in dashed lines in FIG. 3), which may be circumscribed within the rotor blade 328 for routing a coolant 358 through the airfoil 340 between the pressure side wall 344 and the suction side wall 346, thus providing convective cooling thereto. The cooling passages 356 may be at least partially defined by and between a plurality of ribs 374. The ribs 374 extend partially through the cooling circuit 372 generally along the radial direction R, e.g., as illustrated in FIG. 3. The ribs 374 may extend fully through the cooling circuit 372 between the pressure side wall 344 and the suction side wall 346, e.g., as illustrated in FIG. 6. The plurality of ribs 374 may thereby partition the cooling circuit 372 and at least partially form or define the cooling passages 356. For example, each rib 374 may radially terminate near one of a root turn 376 or a tip turn 378.

As illustrated in FIG. 3, the cooling circuit 372 may be a serpentine cooling circuit comprising a plurality of root turns 376, e.g., approximately 180° turns proximate the root 348 of the airfoil 340, and a plurality of tip turns 378, e.g., approximately 180° turns proximate the tip 350 of the airfoil 340. The serpentine cooling circuit 372 may extend along a first cooling passage 356 of the plurality of cooling passages 356 in a first direction, reverse direction through a tip turn 378, extend along a second cooling passage 356 of the plurality of cooling passages 356 in a second direction generally opposite the first direction, again reverse direction through a root turn 376, returning to the first direction along a third cooling passage 356 of the plurality of cooling passages 356, and so forth in any number of iterations.

The coolant 358 may include a portion of the compressed air from the compressor section 14 (FIG. 1) and/or steam or any other suitable gas or other fluid for cooling the airfoil 340. One or more cooling passage inlets 360 are disposed along the rotor blade 328. In some embodiments, one or more cooling passage inlets 360 are formed within, along or by the mounting body 338. The cooling passage inlets 360 are in fluid communication with at least one corresponding cooling passage 356. A plurality of coolant outlets 364 may be in fluid communication with the tip cavity 366. Each cooling passage 356 is in fluid communication with at least one of the coolant outlets 364. In some embodiments, the tip cavity 366 may be at least partially surrounded by a pressure side tip rail 368 and a suction side tip rail 370.

As may be seen in FIG. 3, the cooling passages 356 extend within each of the shank portion 336 and the airfoil portion 340. For example, the cooling passages 356 may extend between the shank portion 336 and the airfoil portion 340, e.g., from the shank portion 336 to the airfoil portion 340, such as from the one or more cooling passage inlets 360 in the shank portion 336 to the at least one coolant outlet 364 in the tip 350 of the airfoil portion 340.

Figure 5:
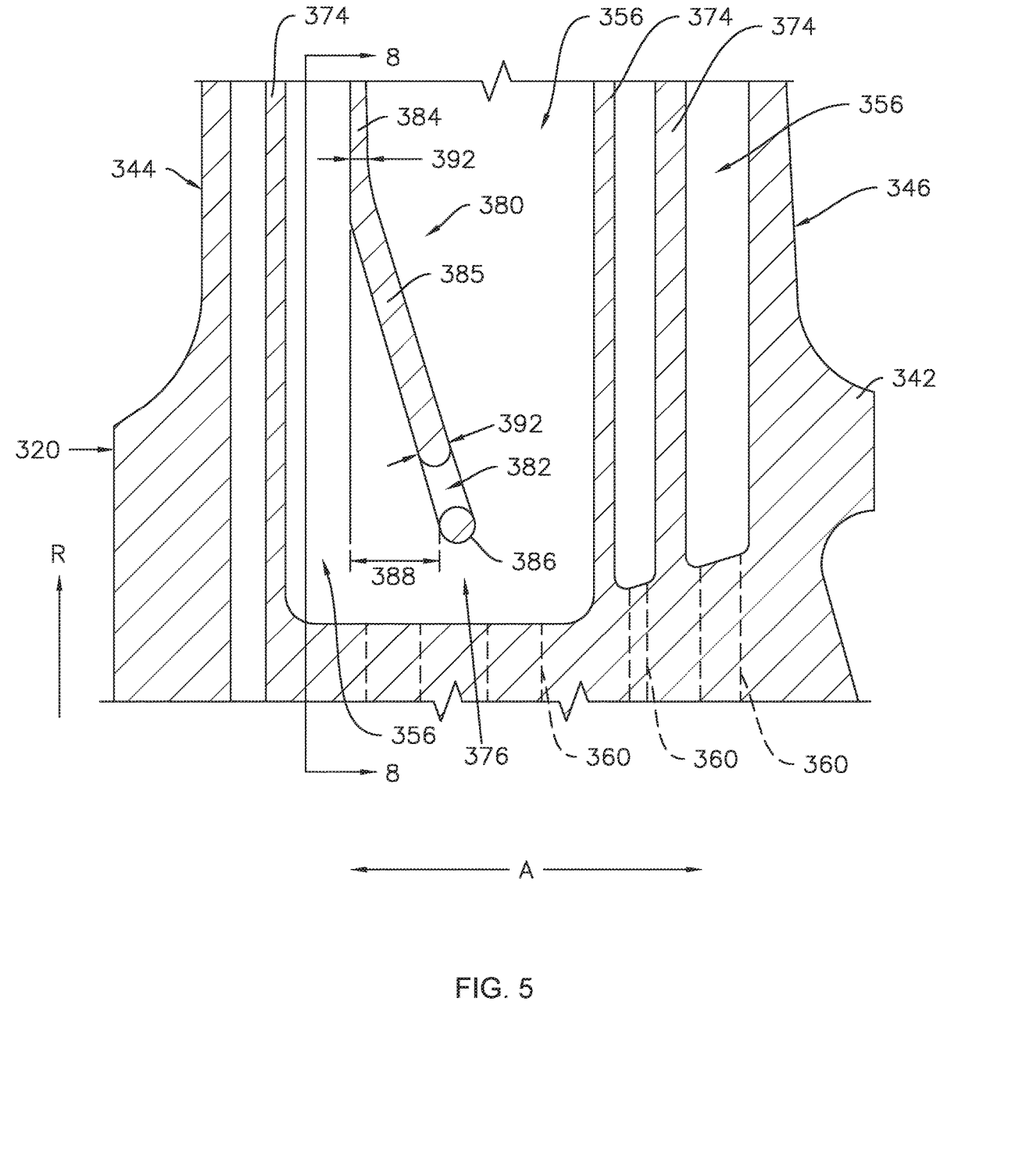
FIG. 5 illustrates an enlarged section view of a portion of the rotor blade taken along line 5-5 in FIG. 4.

The rotor blade 328 may also include an offset rib 380. The offset rib 380 may be positioned proximate the leading edge 352 of the airfoil 340, e.g., closer to the leading edge 352 than to the trailing edge 354, such as in a forwardmost portion or turn of the cooling circuit 372. As may be seen, e.g., in FIG. 5, the offset rib 380 may be offset along the axial direction A. For example, the offset rib 380 may include an outer portion 384, which is generally aligned with the radial direction R and/or the plurality of ribs 374, and an offset portion 385, which is radially inward of the outer portion 384 (e.g., closer to the root 348 of the airfoil 340 and/or the shank portion 336 of the rotor blade 328). The offset portion 385 of the offset rib 380 may be offset along the axial direction A by a distance 388, as illustrated in FIG. 5. The offset rib 380 may be offset aftward, e.g., in a downstream direction, such as towards the trailing edge 354 of the airfoil 340 and/or towards the trailing face 322 of the platform 342. The offset rib 380 may extend inward along the radial direction R to a tip 386 which defines an inward terminus of the rib 380. The portion of the cooling circuit 372 inward of the tip 386 of the offset rib 380 may be continuous from one cooling passage 356 to a next, adjoining, cooling passage 356, whereby a turn in the cooling circuit 372 is defined. More particularly, where the tip 386 of the offset rib 380 is proximate the root 348 of the airfoil 340, e.g., closer to the root 348 than to the tip 350, the turn in the cooling circuit 372 defined by the offset rib 380 may be a root turn 376.

Figure 4:
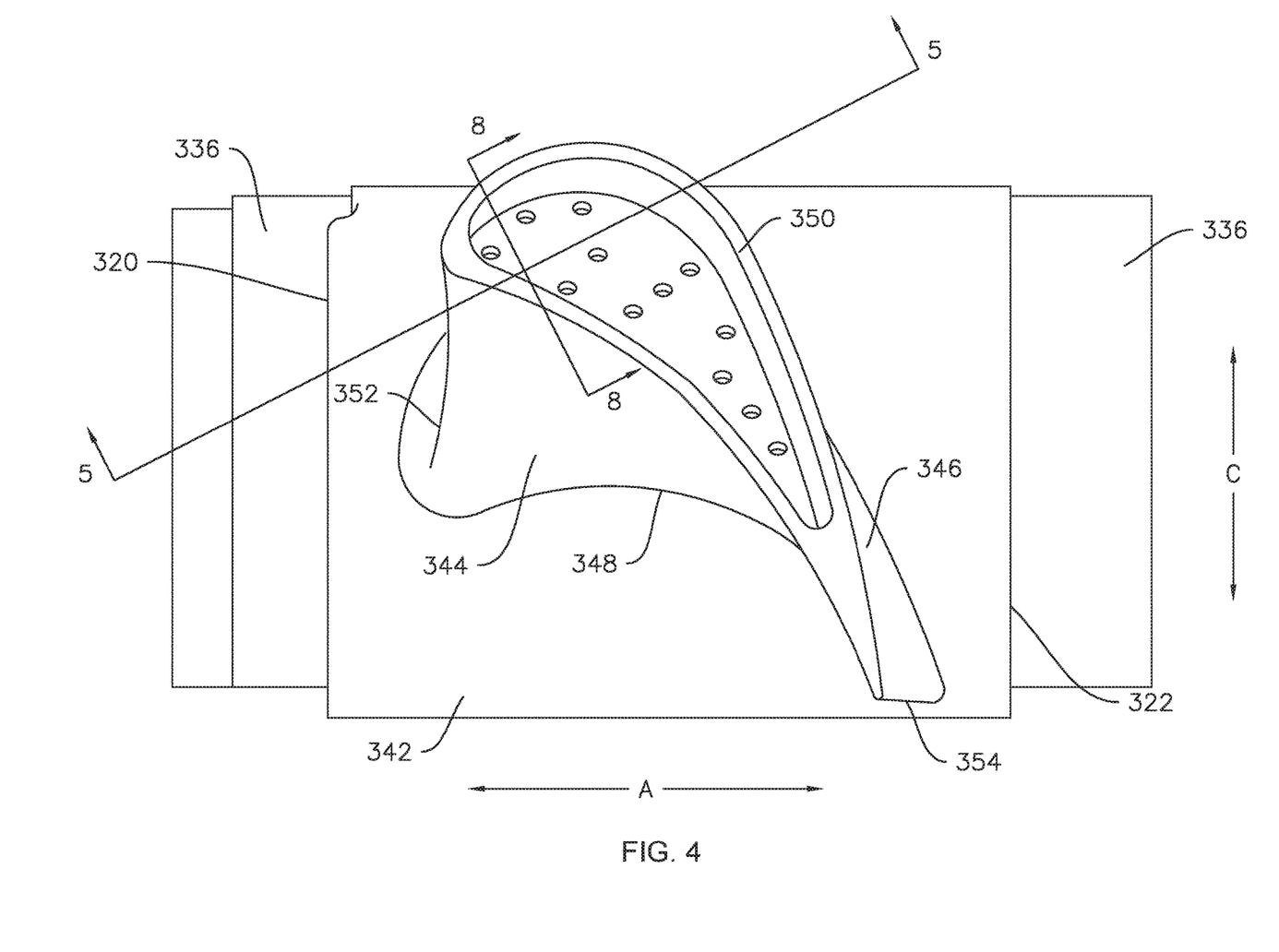
FIG. 4 illustrates a radially inward looking plan view of an exemplary rotor blade, in accordance with embodiments of the present disclosure
Figure 8:
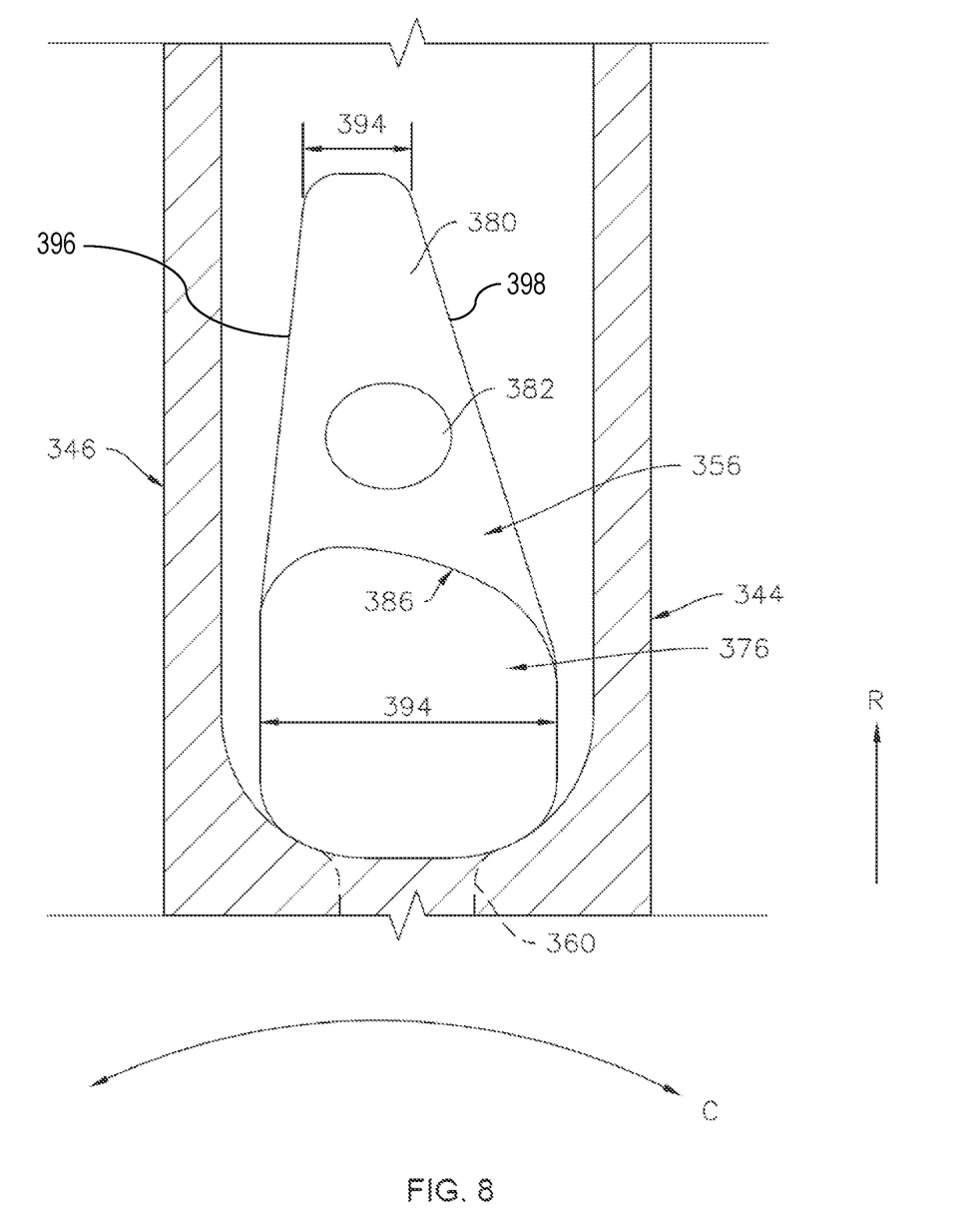
FIG. 8 illustrates an enlarged section view of a portion of the rotor blade taken along line 8-8 in FIGS. 4 and 5.

FIG. 4 provides a plan view of the example rotor blade 328 looking radially inward. FIG. 5 provides an enlarged longitudinal section view of a portion of the rotor blade 328 taken along line 5-5 in FIG. 4. FIG. 8 provides an enlarged section view of the portion of the rotor blade 328 taken along a section plane as indicated by lines 8-8 in FIGS. 4 and 5. As may be seen, e.g., in FIGS. 5 and 8, the offset rib 380 generally separates and defines two adjacent cooling passages 356 of the plurality of cooling passages 356. In some embodiments, e.g., as illustrated in FIGS. 5 and 8, the offset rib 380 may also include one or more perforations 382, which extend through the offset rib 380 from one side to another, thereby providing at least one additional passage through the or each perforation 382 for coolant 358 from one cooling passage 356 to the next cooling passage 356, e.g., in addition to the root turn 376. In embodiments where more than one perforation 382 is provided, the perforations 382 may vary in size. For example, the perforations 382 may be smaller in proportion as the width or thickness 392 of the rib 380 becomes less.

Figure 7:
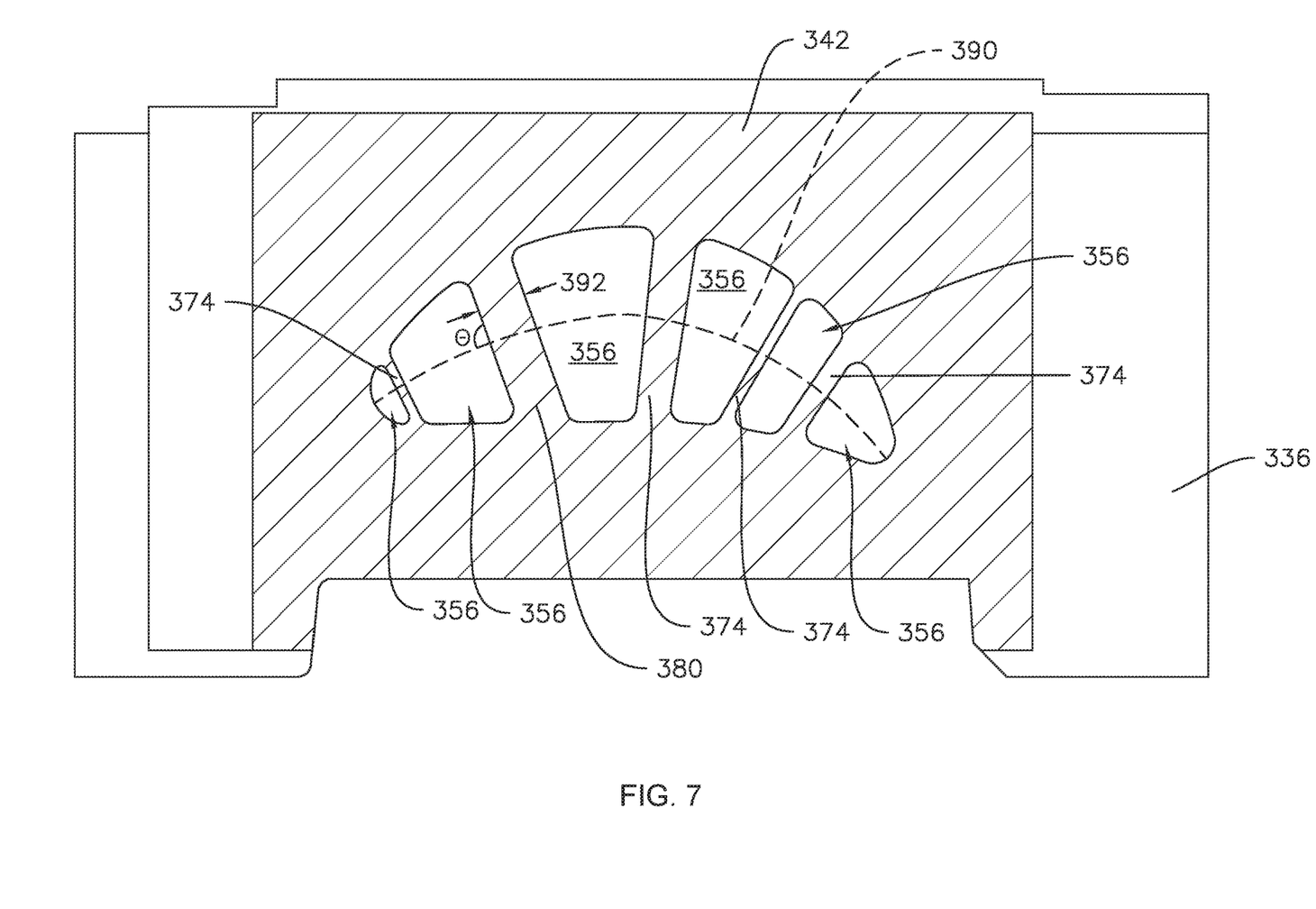
FIG. 7 illustrates a radially inward oriented section view taken through a platform of an exemplary rotor blade along line 7-7 in FIG. 2, in accordance with embodiments of the present disclosure.

FIG. 6 illustrates a section view of the rotor blade 328 taken through the airfoil 340 along line 6-6 in FIG. 2 and looking radially inward. FIG. 7 illustrates a section view of the rotor blade 328 taken through the platform 342 along the line 7-7 in FIG. 2 and looking radially inward. As may be seen, e.g., in FIGS. 5 through 7, the offset rib 380 may define a thickness 392, e.g., generally along the axial direction A and/or along the flow direction defined from the leading edge 352 to the trailing edge 354 of the airfoil 340. In some embodiments, e.g., as illustrated in FIGS. 5 through 7, the thickness 392 of the offset rib 380 may increase moving inward along the radial direction R, e.g., the thickness 392 of the offset rib 380 may increase towards the root 348 of the airfoil 340 and/or towards the shank portion 336 of the rotor blade 328.

As may be seen, e.g., in FIGS. 6 and 7, the airfoil 340 may define a camber line 390 extending from the leading edge 352 to the trailing edge 354. Those of ordinary skill in the art will recognize that the term "camber line" refers to the middle or mean line of an airfoil profile, e.g., halfway between the pressure side surface and the suction side surface. In the present disclosure, the pressure side surface and the suction side surface of the airfoil 340 are defined by the pressure side wall 344 and the suction side wall 346, respectively.

The offset rib 380 may define an angle Θ ("theta") with the camber line 390. In some embodiments, the angle Θ may be generally perpendicular to the camber line 390 proximate the tip 350 of the airfoil 340 and may vary along the radial direction R. For example, the angle Θ may increase moving radially inwardly (e.g., towards the root 348 of the airfoil 340 and/or the shank portion 336 of the rotor blade 328) along the offset rib 380. For example, the offset rib 380 may converge with or diverge from the camber line 390 moving radially inward toward the lower shank 336, such that the angle Θ may increase or decrease inwardly along the radial direction R. Thus, a dimension of the offset rib 380 spanning between the pressure side wall 344 and the suction side wall 346 (e.g., a width 394 of the offset rib 380, as described below) may increase, and the offset rib 380 may thereby provide increased structural compliance to the rotor blade 328, e.g., to the airfoil 340 thereof.

As illustrated in FIG. 8, the cooling circuit 372, e.g., the cooling passage 356 and/or root turn 376 thereof, may define a width 394. The width 394 of the cooling circuit 372 may be defined along the circumferential direction C, along a direction generally perpendicular to the camber line 390, and/or along a direction between the pressure side wall 344 and the suction side wall 346, such as generally perpendicular to the pressure side wall 344 and the suction side wall 346. As may be seen in FIG. 8, in some embodiments, the width 394 of the cooling circuit 372, e.g., of the cooling passages 356 thereof defined in part by the offset rib 380, may increase inwardly along the radial direction R, e.g., towards the root 348 of the airfoil 340 and/or towards the shank portion 336 of the rotor blade 328. Furthermore, as shown in FIG. 8, the width 394 may be defined between a first boundary surface 396 and a second boundary surface 398. The first boundary surface 396 and the second boundary surface 398 are non-parallel to one another, such that the width 394 increases towards the root 348 of the airfoil 340.

As may be seen by comparing FIG. 5 with FIG. 8, the offset rib 380 is illustrated in the background of FIG. 8. Also, the offset rib 380 is angled away from the section plane (into the page) in FIG. 8. Thus, it should be understood that the cooling passage 356 as indicated in FIG. 8 is illustrated in the foreground, e.g., in front of the offset rib 380 which partially defines the cooling passage 356, such that the arrow for 356 in FIG. 8 should be understood as pointing to the space in front of the offset rib 380.

In some embodiments, the root turn 376 may be oblong, e.g., ovoid, in shape. For example, as may be seen in FIG. 8, the tip 386 of the offset rib 380 which defines a radially outer boundary of the root turn 376 may be skewed or asymmetrical. Thus, for example, the terminal end, e.g., tip 386, of the offset rib 380 may define a non-circular arcuate boundary of the root turn 376. Such geometry may provide smoothed stress flow contouring.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims, or if they include equivalent structural elements with insubstantial differences from the literal language of the claims.

What is claimed is:

1. A rotor blade for a turbomachine, comprising:
    a platform;
    an airfoil extending from a root at the platform to a tip, the airfoil having a pressure side wall and a suction side wall; and
    a cooling circuit extending within the platform and the airfoil, the cooling circuit comprising a plurality of cooling passages defined by a plurality of ribs, the plurality of ribs comprising an offset rib having neighboring cooling passages of the plurality of cooling passages defined on either side, the offset rib including an outer portion and an offset portion, the outer portion generally aligned with a radial direction and extending between the tip and the offset portion, the offset portion converging towards an adjacent rib from the outer portion to the terminal end, the terminal end partially defining a root turn that fluidly couples the neighboring cooling passages of the plurality of cooling passages, wherein a perforation is defined in the offset portion of the offset rib radially outward of the root turn, wherein the offset portion of the offset rib defines a width between a first boundary surface and a second boundary surface along a direction perpendicular to both the pressure side wall and the suction side wall, and wherein the first boundary surface and the second boundary surface are non-parallel to one another, such that the width of the offset rib increases towards the root of the airfoil.

2. The rotor blade of claim 1, wherein the offset portion of the offset rib is offset from the outer portion along an axial direction.

3. The rotor blade of claim 1, wherein the offset portion of the offset rib is offset from the outer portion towards a trailing edge of the airfoil.

4. The rotor blade of claim 1, wherein the terminal end of the offset rib defines a non-circular arcuate boundary of the root turn of the cooling circuit, the non-circular arcuate boundary being concave opening downward with respect to a radial direction.

5. The rotor blade of claim 1, wherein the offset rib is positioned proximate a leading edge of the airfoil.

6. The rotor blade of claim 1, wherein the cooling circuit comprises a serpentine cooling circuit.

7. A turbomachine defining an axial direction, a circumferential direction extending around the axial direction, and a radial direction perpendicular to the axial direction, the turbomachine comprising:
    a compressor;
    a combustor downstream of the compressor; and
    a turbine downstream of the combustor, the turbine comprising a rotor blade mounted to a rotor disk, the rotor blade comprising:
    a platform;
    an airfoil extending outward along the radial direction from a root at the platform to a tip, the airfoil having a leading edge, a trailing edge, a pressure side wall, and a suction side wall; and
    a cooling circuit extending within the platform and the airfoil, the cooling circuit comprising a plurality of cooling passages defined by a plurality of ribs, the plurality of ribs comprising an offset rib, the offset rib including an outer portion and an offset portion, wherein the offset portion of the offset rib defines a width between a first boundary surface and a second boundary surface along a direction perpendicular to both the pressure side wall and the suction side wall, and wherein the first boundary surface and the second boundary surface are non-parallel to one another, such that the width of the offset rib increases towards the root of the airfoil.

8. The turbomachine of claim 7, wherein the offset portion of the offset rib is offset from the outer portion along an axial direction.

9. The turbomachine of claim 7, wherein the offset portion of the offset rib is offset from the outer portion towards the trailing edge of the airfoil.

10. The turbomachine of claim 7, wherein the offset rib includes neighboring cooling passages of the plurality of cooling passages defined on either side, wherein a root turn of the offset rib fluidly couples the neighboring cooling passages, and wherein a terminal end of the offset rib defines a non-circular arcuate boundary of the root turn of the cooling circuit, the non-circular arcuate boundary being concave opening downward with respect to a radial direction.

11. The turbomachine of claim 7, wherein the offset rib is positioned proximate the leading edge of the airfoil.

12. A rotor blade for a turbomachine, comprising:
a platform;
an airfoil extending from a root at the platform to a tip, the airfoil having a pressure side wall and a suction side wall; and
a cooling circuit extending within the platform and the airfoil, the cooling circuit comprising a plurality of cooling passages defined by a plurality of ribs, the plurality of ribs comprising an offset rib, the offset rib including an outer portion and an offset portion, wherein the offset portion of the offset rib defines a width between a first boundary surface and a second boundary surface along a direction perpendicular to both the pressure side wall and the suction side wall, and wherein the first boundary surface and the second boundary surface are non-parallel to one another, such that the width of the offset rib increases towards the root of the airfoil.

13. The rotor blade of claim 12, wherein the offset portion of the offset rib is offset from the outer portion along an axial direction.

14. The rotor blade of claim 12, wherein the offset portion of the offset rib is offset from the outer portion towards a trailing edge of the airfoil.

15. The rotor blade of claim 12, wherein the offset rib is positioned proximate a leading edge of the airfoil.

16. The rotor blade of claim 12, wherein the cooling circuit comprises a serpentine cooling circuit.

* * * * *